Aug. 14, 1923.
G. A. JOHNSON
COLLAR HOLDER
Filed Nov. 14, 1922
1,464,658
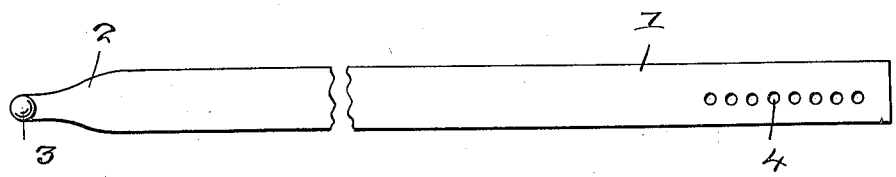
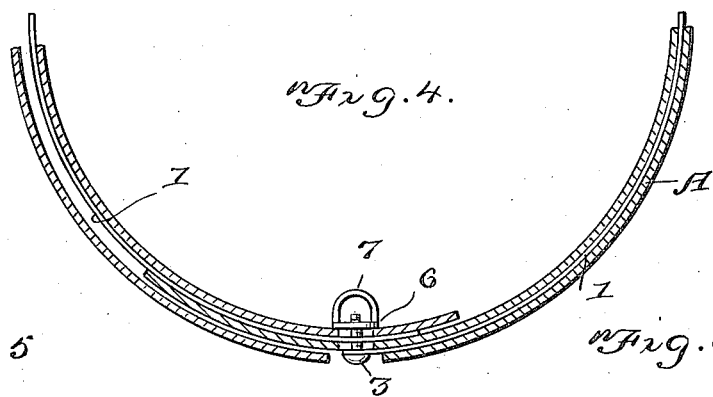
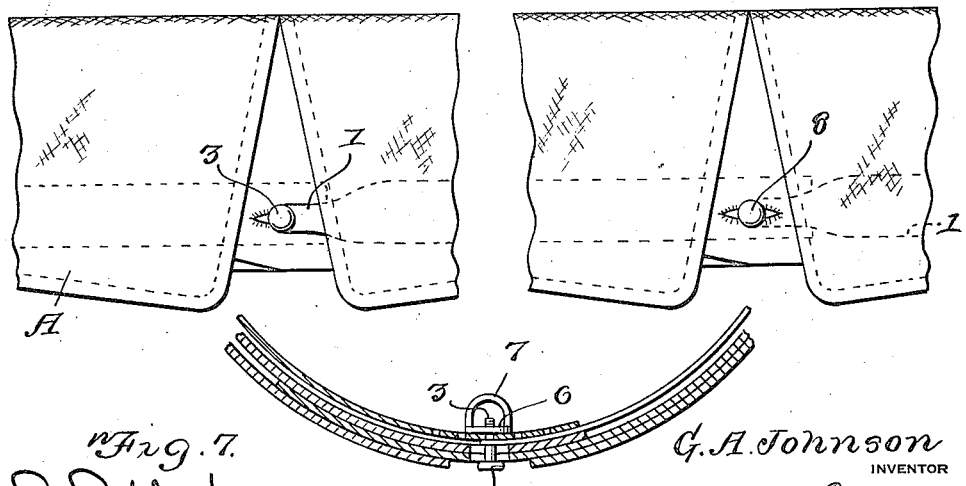

Patented Aug. 14, 1923.

1,464,658

UNITED STATES PATENT OFFICE.

GUSTAF AARON JOHNSON, MANKATO, MINNESOTA.

COLLAR HOLDER.

Application filed November 14, 1922. Serial No. 600,899.

*To all whom it may concern:*

Be it known that I, GUSTAF AARON JOHNSON, a citizen of the United States, residing at Mankato, in the county of Blue Earth and State of Minnesota, have invented new and useful Improvements in Collar Holders, of which the following is a specification.

This invention relates to a collar holder, the general object of the invention being to provide means for holding a soft collar in shape while displaying it.

Another object of the invention is to make the device adjustable so that it can be used in different sizes of collars.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of the device in open position.

Figure 2 is an edge view.

Figure 3 is a view of the nut used with the member.

Figure 4 is an edge view showing the device in closed position.

Figures 5 and 6 are views showing the device connected with a collar.

Figure 7 is a sectional view through a collar showing the device in use.

As shown in these views the device consists of a spring metal band 1, though it may be formed of celluloid or the like if desired. One end of the band is reduced, as shown at 2, and this end carries a bolt 3 which is preferably permanently connected with the band. The other end of the band is provided with a plurality of holes 4 for receiving the bolt when the device is in use. A nut 6 is adapted to engage the bolt to hold the device in closed position, said nut having a looped handle 7.

The device is placed in the collar, which is shown at A, and the bolt is passed through the button holes in the collar and through one of the holes 4, according to the size of the collar. The nut is then placed on the bolt and screwed home. Thus the collar will be held in the shape which it will assume when placed on the neck. The device can be given an attractive finish to make it more attractive, particularly in cases where a part of the device is shown. The device can be given different shapes when made of metal.

The head of the bolt may be spaced from the band, as shown at 8 in the modification, so that this head can be used as a collar button.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A collar holder of the class described comprising a metal band having a number of holes adjacent one end and its other end reduced, a bolt carried by said reduced end for engaging any one of the holes and the button holes in a collar and a nut for engaging the bolt.

GUSTAF AARON JOHNSON.